United States Patent
Dayton

(10) Patent No.: US 8,082,953 B2
(45) Date of Patent: Dec. 27, 2011

(54) SOLENOID VALVE ASSEMBLY

(75) Inventor: Robert Andrew Dayton, Attica, MI (US)

(73) Assignee: Eaton Corporation, Cleveland, OH (US)

( * ) Notice: Subject to any disclaimer, the term of this patent is extended or adjusted under 35 U.S.C. 154(b) by 554 days.

(21) Appl. No.: 12/358,452

(22) Filed: Jan. 23, 2009

(65) Prior Publication Data

US 2009/0189105 A1   Jul. 30, 2009

Related U.S. Application Data

(60) Provisional application No. 61/062,363, filed on Jan. 25, 2008.

(51) Int. Cl.
*F16K 31/06* (2006.01)

(52) U.S. Cl. .............. 137/625.65; 251/129.18; 335/273; 335/298

(58) Field of Classification Search ............ 137/625.65, 137/625.69; 251/129.15, 129.18, 285; 335/273, 335/274, 286, 298
See application file for complete search history.

(56) References Cited

U.S. PATENT DOCUMENTS

| | | | |
|---|---|---|---|
| 3,073,345 A * | 1/1963 | Hagler ................... | 137/625.65 |
| 4,539,542 A | 9/1985 | Clark | |
| 4,635,683 A | 1/1987 | Nielsen | |
| 4,838,954 A * | 6/1989 | Perach ................... | 251/129.15 |
| 4,932,439 A * | 6/1990 | McAuliffe, Jr. ........ | 137/625.65 |
| 4,954,799 A * | 9/1990 | Kumar .................... | 335/273 |
| 4,971,116 A * | 11/1990 | Suzuki et al. .......... | 137/625.65 |
| 4,979,542 A | 12/1990 | Mesenich | |
| 5,036,885 A * | 8/1991 | Miura ..................... | 137/625.65 |
| 5,118,077 A * | 6/1992 | Miller et al. ........... | 251/129.15 |
| 5,156,184 A * | 10/1992 | Kolchinsky ............ | 137/625.65 |
| 6,019,120 A | 2/2000 | Najmolhoda et al. | |
| 6,050,542 A * | 4/2000 | Johnson et al. ........ | 251/129.15 |
| 6,109,300 A | 8/2000 | Najmolhoda | |
| 6,269,827 B1 | 8/2001 | Potter | |
| 6,435,472 B1 | 8/2002 | Najmolhoda et al. | |
| 6,684,896 B2 * | 2/2004 | Weiss et al. ........... | 251/129.21 |
| 7,219,875 B2 | 5/2007 | Dayton | |
| 2005/0269538 A1* | 12/2005 | Haynes et al. ......... | 251/129.15 |
| 2007/0138422 A1 | 6/2007 | Najmolhoda et al. | |
| 2007/0181087 A1 | 8/2007 | Lou | |

FOREIGN PATENT DOCUMENTS

DE    4423103 A1    1/1996
EP    0385286 A2    9/1990

* cited by examiner

*Primary Examiner* — Craig Schneider
*Assistant Examiner* — Craig J Price
(74) *Attorney, Agent, or Firm* — Quinn Law Group, PLLC

(57) ABSTRACT

A solenoid valve assembly includes a bobbin supporting a coil and having at least one protrusion on an inner surface, an adjustment member disposed within the bobbin and in contact with the at least one protrusion, a pole piece disposed within the adjustment member, a valve body having a seat, wherein the bobbin is disposed in contact with the seat, a spool slideably disposed within the valve body, and a resilient member disposed in contact with the adjustment member and the spool.

18 Claims, 3 Drawing Sheets

SOLENOID VALVE ASSEMBLY

CROSS-REFERENCE TO RELATED APPLICATIONS

This application claims priority to U.S. Provisional Patent Application No. 61/062,363, which was filed on Jan. 25, 2008.

TECHNICAL FIELD

The present invention generally relates to solenoid valves, and more particularly, to variable force solenoid valves.

BACKGROUND OF THE INVENTION

Solenoid valves are useful for many applications requiring controlled fluid flow. For example, solenoid valves may be used to control hydraulic pressure in an automatic transmission of a vehicle. One type of solenoid valve, a variable force solenoid valve, is often used to apply a clutch for smooth shifting or to control transmission line pressure.

Problematically, however, existing solenoid valves often suffer from a lack of concentricity among components, particularly among magnetically-attractive surfaces. Such lack of concentricity may cause friction between components and a resulting reduced solenoid valve response. Therefore, many existing solenoid valves are unsuitable for applications requiring sensitive solenoid valve response for minimal hydraulic pressure changes.

SUMMARY OF THE INVENTION

A solenoid valve assembly includes a bobbin supporting a coil and having at least one protrusion on an inner surface. The solenoid valve assembly also includes an adjustment member disposed within the bobbin and in contact with the at least one protrusion. Further, the solenoid valve assembly includes a pole piece disposed within the adjustment member and a valve body having a seat, wherein the bobbin is disposed in contact with the seat. Additionally, the solenoid valve assembly includes a spool slideably disposed within the valve body, and a resilient member disposed in contact with the adjustment member and the spool.

In another embodiment, the spool is slideably disposed within the valve body and spaced opposite the pole piece.

In a further embodiment, the solenoid valve assembly includes a bobbin supporting a coil and having at least one annular protrusion on an inner surface. Additionally, the solenoid valve assembly includes the adjustment member disposed within the bobbin and in contact with the at least one annular protrusion. Further, the solenoid valve assembly includes a pole piece having a first surface and disposed within the adjustment member, and a valve body having a frusto-conical seat, wherein the bobbin is disposed in contact with the frusto-conical seat. A spool is slideably disposed within the valve body and spaced opposite the pole piece. The spool has a second surface configured to correspond to the first surface to form a working air gap between the pole piece and the spool. The spool is disposed substantially concentric with the pole piece across the working air gap. The solenoid valve assembly also includes a resilient member disposed in contact with the adjustment member and the spool. The bobbin, the adjustment member, the pole piece, the spool, and the valve body are each disposed substantially concentrically about a central longitudinal axis of the solenoid valve assembly.

The above features and advantages and other features and advantages of the present invention are readily apparent from the following detailed description of the best modes for carrying out the invention when taken in connection with the accompanying drawings.

DETAILED DESCRIPTION OF THE EMBODIMENTS

Figure 1:
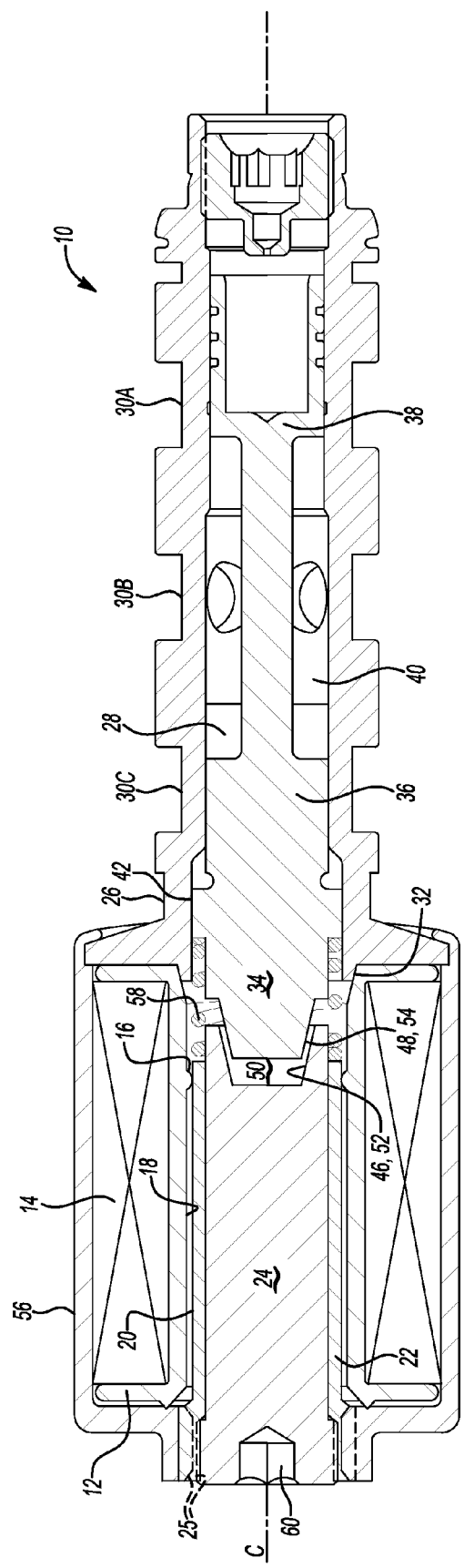
FIG. 1 is a schematic cross-sectional view of a solenoid valve assembly including a bobbin, an adjustment member, a pole piece, a valve body, a spool, and a resilient member.

Referring to the drawings, wherein like reference numerals refer to like components, a solenoid valve assembly is shown generally at 10 in FIG. 1. The solenoid valve assembly may be useful for automotive applications, such as applications relating to automatic transmissions. However, it is to be appreciated that the solenoid valve assembly 10 may also be useful for other non-automotive applications, such as, but not limited to, aerospace applications.

Referring to FIG. 1, the solenoid valve assembly 10 includes a bobbin 12 supporting a coil 14. The bobbin 12 may provide an annular support for the coil 14 and may be formed from any suitable non-magnetic material known in the art. For example, the bobbin 12 may be formed from molded plastic, such as a glass-filled thermoplastic. The bobbin 12 may also include one or more flanges for supporting the coil 14.

The coil 14 may be formed from an electrically-conductive material. For example, the coil 14 may be formed from copper wire. The coil 14 may be wound around the bobbin 12 in one or more turns, i.e., windings. In use, an electrical current may be applied to the coil 14 from a power source, such as, for example, a controller of a powertrain, to induce a magnetic flux.

Referring to FIG. 1, the bobbin 12 has at least one protrusion 16 on an inner surface 18. As used herein, the terminology "inner" refers to elements disposed relatively closer to a central longitudinal axis C of the solenoid valve assembly 10. In contrast, the terminology "outer" refers to elements disposed relatively farther from the central longitudinal axis C. For example, the at least one protrusion 16 may protrude from the bobbin 12 towards the central longitudinal axis C. In particular, the inner surface 18 of the bobbin 12 may define a bore 20, whereas an outer surface of the bobbin 12 may support the coil 14.

The at least one protrusion 16 may be annular. Further, the at least one protrusion 16 may have a frusto-conical cross-section. The at least one protrusion 16 is configured to align the bobbin 12 with other components of the solenoid valve assembly 10, as set forth in more detail below. That is, without intending to be limited by theory, it is believed that at least one protrusion 16, which may be frusto-conical, contributes to a concentricity of the solenoid valve assembly 10 by stabilizing components within the bore 20 of the bobbin 12. The at least one protrusion 16 may be unitary, i.e., integral, with the bobbin 12. The solenoid valve assembly 10 may include one or more than one protrusion 16.

Referring to FIG. 1, the solenoid valve assembly 10 includes an adjustment member 22. The adjustment member 22 generally provides preloading and calibration adjustment of the solenoid valve assembly 10, as set forth in more detail below. The adjustment member 22 is disposed within the bobbin 12 and in contact with the at least one protrusion 16. As such, the adjustment member 22 may be generally cylindrically-shaped so as to be disposed within the bore 20 defined by the inner surface 18 of the bobbin 12. Further, the adjustment member 22 may be hollow and define a chamber which receives another component of the solenoid valve assembly 10, also as set forth in more detail below.

In use, the adjustment member 22 may be aligned with the bobbin 12 via the at least one protrusion 16 of the bobbin 12. That is, the at least one protrusion 16 may be configured to align the bobbin 12 and the adjustment member 22 substantially concentrically within the solenoid valve assembly 10. As used herein, the terminology "concentrically" refers to elements or components having a common center along the central longitudinal axis C of the solenoid valve assembly 10. Further, as used herein, the terminology "substantially" is used to represent the inherent degree of uncertainty that may be attributed to any quantitative comparison, value, measurement, or other representation. As such, it refers to an arrangement of elements or features that, while in theory would be expected to exhibit exact correspondence or behavior, may in practice embody something slightly less than exact. The term also represents the degree by which a quantitative representation may vary from a stated reference without resulting in a change in the basic function of the subject matter at issue. Therefore, it is contemplated that the bobbin 12 and the adjustment member 22 may be slightly less than or more than concentrically aligned within the solenoid valve assembly 10.

Referring to FIG. 1, the solenoid valve assembly 10 includes a pole piece 24. The pole piece 24 generally provides an attractive surface for other components of the solenoid valve assembly 10, as set forth in more detail below. The pole piece 24 is disposed within the adjustment member 22. As such, the pole piece 24 may be generally cylindrically-shaped so as to be disposed within the chamber defined by the adjustment member 22. The pole piece 24 may also be solid. The pole piece 24 may be formed from any suitable electrically-conductive metal known in the art. For example, the pole piece 24 may be formed from steel.

The pole piece 24 and the adjustment member 22 may be close-fitting. As used herein, the terminology "close-fitting" refers to a minimal distance between surfaces. For example, an outer surface of the pole piece 24 and an inward surface of the adjustment member 22 may be spaced apart by less than 0.1 mm. As used herein, the terminology "inward" refers to elements disposed relatively closer to a central longitudinal axis C of the solenoid valve assembly 10. Each of the pole piece 24 and the adjustment member 22 may be formed of the same shape and may have a difference in diameter of less than 0.1 mm. The pole piece 24 and the adjustment member 22 may be close-fitting so that the pole piece 24 is disposed substantially concentric with the adjustment member 22. The close-fitting pole piece 24 and adjustment member 22 contribute to the excellent concentricity of the solenoid valve assembly 10 by minimizing radial movement of the pole piece 24.

The pole piece 24 may also be configured for attachment to the adjustment member 22. For example, the pole piece 24 may include threads 25 configured for threading the pole piece 24 into the adjustment member 22.

In use, the adjustment member 22 may be centered within the solenoid valve assembly 10 between the bobbin 12 and the pole piece 24. As electrical current is applied to the coil 14, a magnetic flux is induced through the pole piece 24 and the adjustment member 22. Therefore, the pole piece 24 is magnetized and provides a magnetically-attractive surface for other components of the solenoid valve assembly 10. For optimal efficiency of the solenoid valve assembly 10, the pole piece 24 may be substantially longitudinally stationary within the solenoid valve assembly 10, excluding any adjustment via the adjustment member 22 for, for example, preloading and/or calibration.

Referring to FIG. 1, the solenoid valve assembly 10 includes a valve body 26. The valve body 26 may be configured to contain hydraulic fluid, e.g., air or hydraulic oil. Although the valve body 26 may have any shape, the valve body 26 may have a generally cylindrical and elongated shape and may define a spool bore 28. Further, the valve body 26 may include at least three ports, shown generally at 30A, 30B, and 30C. The at least three ports 30A, 30B, and 30C are generally configured for fluidly communicating with equipment external to the solenoid valve assembly 10. For example, the at least three ports 30A, 30B, and 30C may communicate with a hydraulic fluid supply line. In the embodiment for use with an automatic transmission of a vehicle, the at least three ports may include a supply port 30A, a control port 30B, and an exhaust port 30C. In general, oil may be supplied to the solenoid valve assembly 10 via the supply port 30A, oil may flow to clutches or other automatic transmission components via the control port 30B, and excess oil may bleed out of the solenoid valve assembly 10 via the exhaust port 30C. Therefore, as set forth in more detail below, in use, the solenoid valve assembly 10 may balance hydraulic pressure between the supply port 30A and the exhaust port 30C to maintain hydraulic pressure on the control port 30B.

The valve body 26 may be formed of any suitable material according to an operating environment of the solenoid valve assembly 10. For example, the valve body 26 may be formed of steel or aluminum.

Referring to FIG. 1, the valve body 26 has a seat 32, and the bobbin 12 is disposed in contact with the seat 32. That is, the seat 32 of the valve body 26 may be configured to align the bobbin 12 and the valve body 26 substantially concentrically within the solenoid valve assembly 10. The seat 32 may be frusto-conical. The seat 32 may be frusto-conical to provide an abutment, e.g., a shoulder, for the bobbin 12 so that the bobbin 12 may not translate radially from the central longitudinal axis C of the solenoid valve assembly 10. In this embodiment, a portion of the inner surface 18 of the bobbin 12 may be tapered to complement the frusto-conical shape of the seat 32. The seat 32 of the valve body 26 contributes to the excellent concentricity of the solenoid valve assembly 10 by aligning the bobbin 12 and the valve body 26.

Further, the at least one protrusion 16 and the seat 32 may be spaced apart at a distance of less than or equal to 10 mm. The aforementioned distance also contributes to the excellent concentricity of the solenoid valve assembly 10 by minimizing spacing between concentric components, e.g., the pole piece 24, the bobbin 12, and the valve body 26 along the central longitudinal axis C. That is, the distance of less than or equal to 10 mm simplifies the maintenance of concentricity of components of the solenoid valve assembly 10 as compared to existing valves, for example, by minimizing potential radial movement between components.

Referring to FIG. 1, the solenoid valve assembly 10 includes a spool 34 slideably disposed within the valve body 26. As used herein, the terminology "slideably disposed" refers to an ability of the spool 34 to slide, i.e., translate along the central longitudinal axis C of the solenoid valve assembly 10, within the valve body 26. As such, the spool 34 may be similar in shape to the spool bore 28 of the valve body 26. For example, the spool 34 may also have a generally cylindrical and elongated shape.

Further, the spool 34 may include a first sealing portion 36 and a second sealing portion 38. The first sealing portion 36 may be disposed relatively closer to the seat 32 of the valve body 26 than to the second sealing portion 38. Each of the first sealing portion 36 and the second sealing portion 38 may have an axial length greater than or equal to half an axial length of one of the at least three ports 30A, 30B, 30C. In an embodiment for use in an automatic transmission, the first sealing portion 36 may be configured to at least partially seal off the exhaust port 30C. Likewise, the second sealing portion 38 may be configured to at least partially seal off the supply port 30A of the valve body 26.

The spool 34 also may define an annular recession 40 formed in an outer periphery of the spool 34 between the first sealing portion 36 and the second sealing portion 38. The annular recession 40 may be configured to allow fluid communication between at least two of the at least three ports 30A, 30B, 30C. Therefore, the annular recession 40 may extend along the central longitudinal axis C a distance sufficient to at least partially expose each of the at least three ports 30A, 30B, 30C. The annular recession 40 may fully expose at least one of the at least three ports 30A, 30B, 30C. Stated differently, the spool 34 may be configured for balancing hydraulic pressure between the at least three ports 30A, 30B, 30C.

The spool 34 may slide within the valve body 26 in response to electrical current applied to the coil 14. That is, when the electrical current is applied to the coil 14, the spool 34 may be attracted to the pole piece 24. As such, the spool 34 may be formed from a magnetic material, e.g., steel. Further, the spool 34 and the valve body 26 may be close-fitting. For example, an outer surface of the first sealing portion 36 and an inward surface of the valve body 26 may be spaced apart by less than 0.1 mm. A distance between the outer surface of the first sealing portion 36 and the inward surface of the valve body 26 may define a circular air gap 42. A size of the circular air gap, i.e., a distance between the outer surface of the first sealing portion 36 and the inward surface of the valve body 26, may be minimized so as to maximize the concentricity of the spool 34 and the valve body 26.

Similarly, the second sealing portion 38 and the inward surface of the valve body 26 may also be spaced apart by less than 0.1 mm. That is, each of the first sealing portion 36, the second sealing portion 38, and the adjustment member 22 may be formed of the same shape and may have a difference in diameter of less than 0.1 mm. The spool 34 and the valve body 26 may be close-fitting so that so that the spool 34 is disposed substantially concentric with the valve body 26. The close-fitting spool 34 and valve body 26 contribute to the excellent concentricity of the solenoid valve assembly 10 by minimizing radial movement between the spool 34 and the valve body 26. A longitudinal position of the spool 34 within the valve body 26 may also be adjusted via a dashpot 44.

Referring to FIG. 1, the pole piece 24 may have a first surface 46 and the spool 34 may have a second surface 48 configured to correspond with the first surface 46 to form a working air gap 50 between the pole piece 24 and the spool 34. For example, the first surface 46 may form one of a pocket 52 and a projection 54 and the second surface 48 may form another of the pocket 52 and the projection 54. That is, the first surface 46 and the second surface 48 may be complementary. The first surface 46 of the pole piece 24 may have a tapered portion forming the pocket 52 which corresponds and cooperates with a similarly tapered portion of the spool 34 forming the projection 54. Further, the spool 34 may be spaced opposite and disposed substantially concentric with the pole piece 24 across the working air gap 50.

A size and configuration of the working air gap 50 generally determines a magnitude of a force produced by the magnetic flux in relation to the electric current applied to the coil 14. The working air gap 50 may effect axial movement, i.e., sliding, of the spool 34 along the central longitudinal axis C upon energization of the coil 14, e.g. as electrical current is applied to the coil 14. A comparatively weaker force generally results from a comparatively larger working air gap as compared to a smaller working air gap. Further, the working air gap 50 of the solenoid valve assembly 10 may be substantially concentric with the spool 34 and the pole piece 24.

Referring to FIG. 1, the solenoid valve assembly 10 includes a resilient member 58 disposed in contact with the adjustment member 22 and the spool 34. The resilient member 58 may allow adjustment of the force effected by the working air gap 50 and may allow preloading and calibration of the solenoid valve body 26. The resilient member 58 may be any suitable resilient member known in the art, such as, for example, a spring. The resilient member 58 may be disposed adjacent an outer surface of each of the pole piece 24 and the spool 34 and may abut an end of the adjustment member 22 disposed closest to the spool 34 along the central longitudinal axis C of the solenoid valve assembly 10. In use, the force of the solenoid valve assembly 10 may be adjusted, e.g., calibrated and/or preloaded, via a release 60. Further, the adjustment member 22 may adjust, e.g., compress or reduce, the resilient member 58. Since the adjustment member 22 may be attached to and/or close-fitting with the pole piece 24, adjustment of the resilient member 58 may move the pole piece 24 longitudinally so that the size of the working air gap 50 may be reduced or enlarged. The resilient member 58 may be formed from any suitable material known in the art.

Referring to FIG. 1, the solenoid valve assembly 10 may also include a housing 56. The housing may be configured for attachment to the adjustment member 22 and the valve body 26. For example, the housing 56 may be attached to the adjustment member 22 via threads 25 and may be attached to the valve body 26 via an interference fit. That is, an outer surface of the adjustment member 22 may include corresponding threads 25 for attachment to the housing 56. The housing 56 contributes to the excellent concentricity of the solenoid valve assembly 10 by aligning the adjustment member 22 and the valve body 26. Further, the seat 32 may be configured to align the bobbin 12 and the valve body 26 substantially concentrically within the housing 56. Stated differently, the bobbin 12, the adjustment member 22, the pole piece 24, the spool 34, and the valve body 26 may each be disposed substantially concentrically about the central longitudinal axis C of the solenoid valve assembly 10. In particular, the seat 32, the at least one protrusion 16, the close-fitting adjustment member 22 and pole piece 24, and the close-fitting spool 34 and valve body 26 may individually and collectively contribute to the concentricity of the solenoid valve assembly 10, as set forth above.

Figure 2:
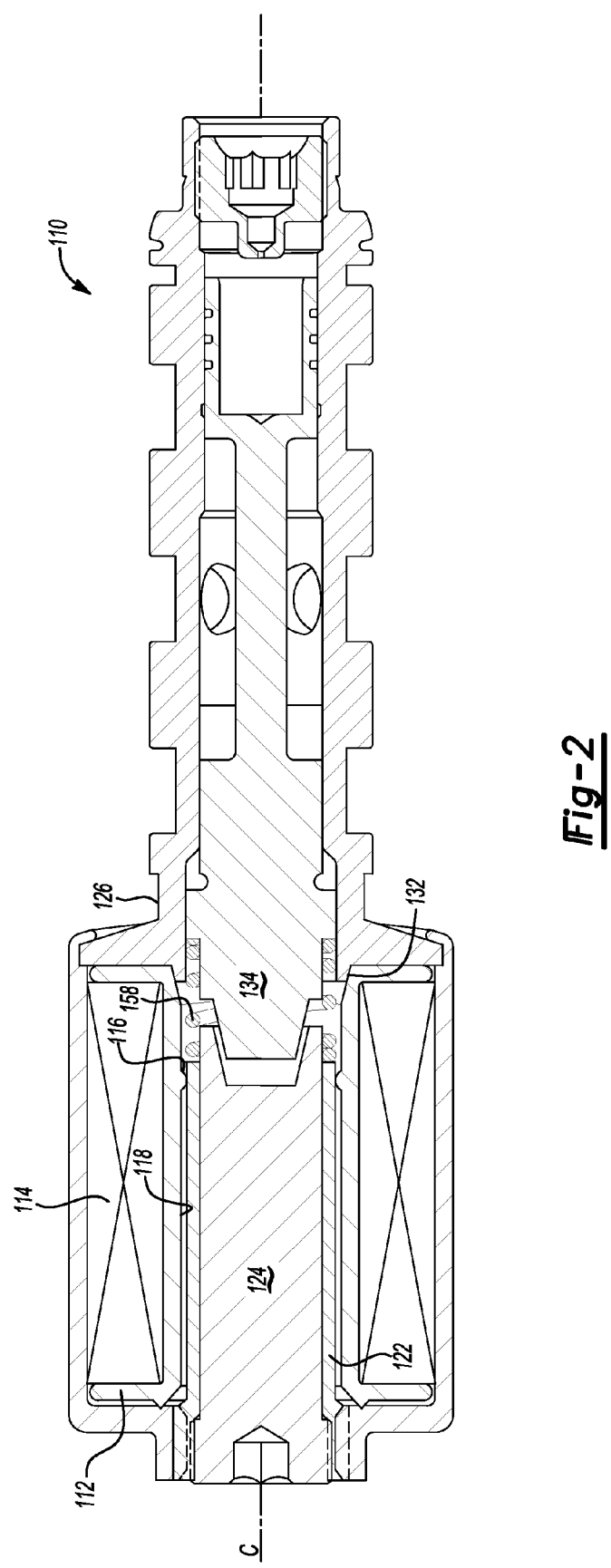
FIG. 2 is a schematic cross-sectional view of another embodiment of the solenoid valve assembly of FIG. 1 including the spool spaced opposite the pole piece.

Referring to FIG. 2, in another embodiment, the solenoid valve assembly 110 includes a bobbin 112 supporting a coil 14 and having at least one protrusion 116 on an inner surface 118 and an adjustment member 122 disposed within the bobbin 112 and in contact with the at least one protrusion 116. Further, the solenoid valve assembly 110 includes a pole piece 124 disposed within the adjustment member 122. The solenoid valve assembly 110 also includes a valve body 126 having a seat 132, wherein the bobbin 112 is disposed in contact with the seat 132. Additionally, the solenoid valve assembly 110 includes a spool 134 slideably disposed within the valve body 126 and spaced opposite the pole piece 124. Further, the solenoid valve assembly 110 also includes a resilient member 158 disposed in contact with the adjustment member 122 and the spool 134.

The spool 134 may be disposed substantially concentric with the pole piece 124. Therefore, the bobbin 112, the adjustment member 122, the pole piece 124, the spool 134, and the valve body 126 may each be disposed substantially concentrically about a central longitudinal axis C of the solenoid valve assembly 110. In particular, the seat 132, the at least one protrusion 116, the adjustment member 122 and pole piece 124, and the spool 134 and valve body 126 may individually and collectively contribute to the concentricity of the solenoid valve assembly 110.

Figure 3:
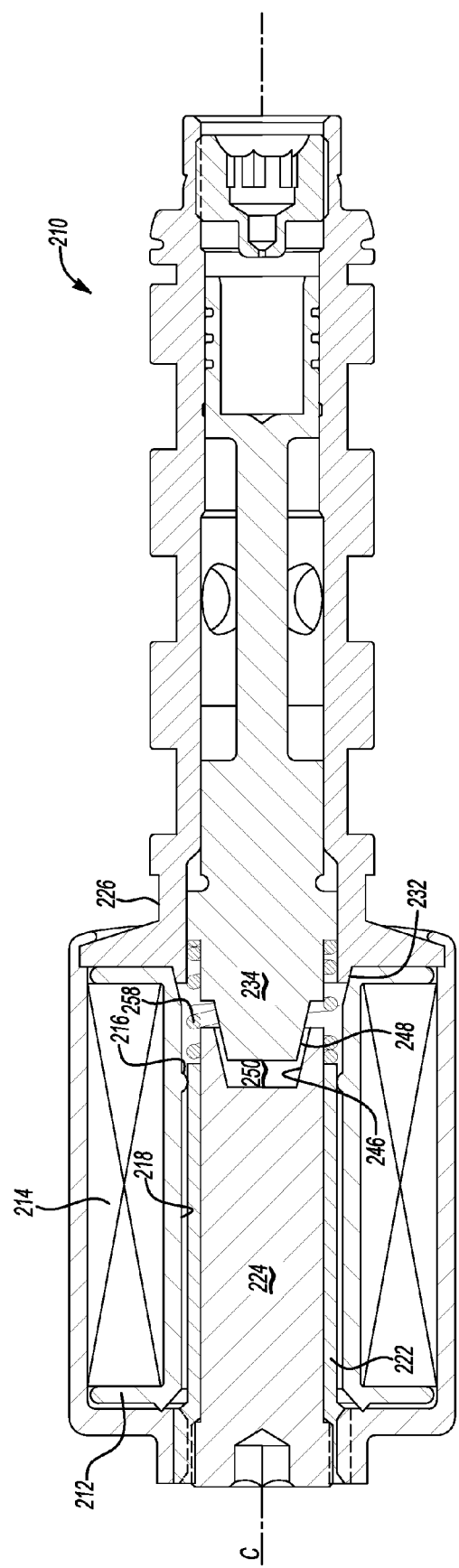
FIG. 3 is a schematic cross-sectional view of a further embodiment of the solenoid valve assembly of FIG. 1 including an annular protrusion, a frusto-conical seat, and a working air gap.

Referring to FIG. 3, in another embodiment, the solenoid valve assembly 210 includes a bobbin 212 supporting a coil 214 and having at least one annular protrusion 216 on an inner surface 218 and an adjustment member 222 disposed within the bobbin 212 and in contact with the at least one annular protrusion 216. Further, the solenoid valve assembly 210 includes a pole piece 224 having a first surface 246 and disposed within the adjustment member 222. The solenoid valve assembly 210 also includes a valve body 226 having a frusto-conical seat 232, wherein the bobbin 212 is disposed in contact with the frusto-conical seat 232. Additionally, the solenoid valve assembly 210 includes a spool 234 slideably disposed within the valve body 226 and spaced opposite the pole piece 224. The spool 234 has a second surface 248 configured to correspond to the first surface 246 to form a working air gap 250 between the pole piece 224 and the spool 234. The spool 234 is disposed substantially concentric with the pole piece 224 across the working air gap 250. Further, the solenoid valve assembly 210 also includes a resilient member 258 disposed in contact with the adjustment member 222 and the spool 234. The bobbin 212, the adjustment member 222, the pole piece 224, the spool 234, and the valve body 226 are each disposed substantially concentrically about a central longitudinal axis C of the solenoid valve assembly 210. In particular, the frusto-conical seat 232, the at least one annular protrusion 216, the adjustment member 222 and pole piece 224, and the spool 234 and valve body 226 may individually and collectively contribute to the concentricity of the solenoid valve assembly 210.

Referring to FIGS. 1-3, the solenoid valve assemblies 10, 110, 210 may be a variable force solenoid valve for an automatic transmission. In use, and described with respect to the solenoid valve assembly 10, the spool 34 translates along the central longitudinal axis C in response to electric current applied to the coil 14. In a de-energized state, e.g., when minimal electric current is applied to the coil 14, the spool 34 seals off a portion of each of the supply port 30A and the exhaust port 30C, thereby allowing some hydraulic fluid to flow into the annular recession 40 of the spool 34 and out each of the control port 30B and the exhaust port 30C. Further, an increase in electric current applied to the coil 14 decreases hydraulic pressure through the control port 30B. That is, as electrical current applied to the coil 14 increases, the spool 34 translates toward the pole piece 24 and seals off an increasing portion of the supply port 30A, thereby decreasing an amount of fluid and hydraulic pressure available to the control port 30B. In contrast, a decrease in electric current applied to the coil 14 increases hydraulic pressure through the control port 30B. That is, as electrical current applied to the coil 14 decreases, the spool 34 translates away from the pole piece 24 and seals off an increasing portion of the exhaust port 30C, thereby increasing an amount of fluid and hydraulic pressure available to the control port 30B. Therefore, a response of the solenoid valve assemblies 10, 110, 210 is infinitely variable according to minimal pressure changes.

The solenoid valve assemblies 10, 110, 210 exhibit excellent concentricity and minimal friction between components. As such, the solenoid valve assemblies 10, 110, 210 exhibit sensitive solenoid valve response for minimal hydraulic pressure changes. The solenoid valve assemblies 10, 110, 210 also minimize a total number of components for simplified maintenance and fabrication of the solenoid valve assemblies 10, 110, 210. Therefore, the solenoid valve assemblies 10, 110, 210 are cost-effective, easily-assembled, and easily-maintained.

While the best modes for carrying out the invention have been described in detail, those familiar with the art to which this invention relates will recognize various alternative designs and embodiments for practicing the invention within the scope of the appended claims.

The invention claimed is:

1. A solenoid valve assembly, comprising:
   a bobbin supporting a coil and having at least one protrusion on an inner surface;
   an adjustment member disposed within said bobbin and in contact with said at least one protrusion;
   a pole piece disposed within said adjustment member;
   a valve body having a seat, wherein said bobbin is disposed in contact with said seat;
   a spool slideably disposed within said valve body; and
   a resilient member disposed in contact with said adjustment member and said spool.

2. The solenoid valve assembly of claim 1, wherein said pole piece has a first surface and said spool has a second surface configured to correspond with said first surface to form a working air gap between said pole piece and said spool.

3. The solenoid valve assembly of claim 2, wherein said first surface forms one of a pocket and a projection and said second surface forms another of said pocket and said projection.

4. The solenoid valve assembly of claim 1, wherein said seat is frusto-conical.

5. The solenoid valve assembly of claim 1, further comprising a housing configured for attachment to said adjustment member and said valve body.

6. The solenoid valve assembly of claim 5, wherein said seat is configured to align said bobbin and said valve body substantially concentrically within said housing.

7. The solenoid valve assembly of claim 1, wherein said at least one protrusion is annular.

8. The solenoid valve assembly of claim 1, wherein said at least one protrusion is configured to align said bobbin and said adjustment member substantially concentrically within the solenoid valve assembly.

9. The solenoid valve assembly of claim 8, wherein said pole piece and said adjustment member are close-fitting.

10. The solenoid valve assembly of claim 1, wherein said spool and said valve body are close-fitting.

11. The solenoid valve assembly of claim 1, wherein said valve body includes at least three ports.

12. The solenoid valve assembly of claim 11, wherein said spool is configured for balancing hydraulic pressure between said at least three ports.

13. The solenoid valve assembly of claim 12, wherein said spool slides within said valve body in response to electrical current applied to said coil.

14. The solenoid valve assembly of claim 1, wherein said bobbin, said adjustment member, said pole piece, said spool, and said valve body are each disposed substantially concentrically about a central longitudinal axis of said solenoid valve assembly.

15. The solenoid valve assembly of claim 1, wherein said at least one protrusion and said seat are spaced apart at a distance of less than or equal to 10 mm.

16. A solenoid valve assembly, comprising:
   a bobbin supporting a coil and having at least one protrusion on an inner surface;
   an adjustment member disposed within said bobbin and in contact with said at least one protrusion;
   a pole piece disposed within said adjustment member;
   a valve body having a seat, wherein said bobbin is disposed in contact with said seat;
   a spool slideably disposed within said valve body and spaced opposite said pole piece; and
   a resilient member disposed in contact with said adjustment member and said spool.

17. The solenoid valve assembly of claim 16, wherein said spool is disposed substantially concentric with said pole piece.

18. A solenoid valve assembly, comprising:
   a bobbin supporting a coil and having at least one annular protrusion on an inner surface;
   an adjustment member disposed within said bobbin and in contact with said at least one annular protrusion;
   a pole piece having a first surface and disposed within said adjustment member;
   a valve body having a frusto-conical seat, wherein said bobbin is disposed in contact with said frusto-conical seat;
   a spool slideably disposed within said valve body and spaced opposite said pole piece;
   wherein said spool has a second surface configured to correspond to said first surface to form a working air gap between said pole piece and said spool and is disposed substantially concentric with said pole piece across said working air gap; and
   a resilient member disposed in contact with said adjustment member and said spool;
   wherein said bobbin, said adjustment member, said pole piece, said spool, and said valve body are each disposed substantially concentrically about a central longitudinal axis of said solenoid valve assembly.

* * * * *